United States Patent
Koeninger

(10) Patent No.: US 10,181,959 B2
(45) Date of Patent: Jan. 15, 2019

(54) METHODS AND SYSTEMS FOR MINDFUL HOME AUTOMATION

(71) Applicant: International Business Machines Corporation, Armonk, NY (US)

(72) Inventor: R Kent Koeninger, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 15/217,986

(22) Filed: Jul. 23, 2016

(65) Prior Publication Data

US 2017/0033942 A1    Feb. 2, 2017

Related U.S. Application Data

(60) Provisional application No. 62/197,347, filed on Jul. 27, 2015.

(51) Int. Cl.
*H04L 12/28* (2006.01)
*G05B 15/02* (2006.01)

(52) U.S. Cl.
CPC ............ *H04L 12/282* (2013.01); *G05B 15/02* (2013.01); *H04L 12/2807* (2013.01); *H04L 12/2827* (2013.01); *H04L 12/2829* (2013.01); *H04L 12/2834* (2013.01); *G05B 2219/2642* (2013.01)

(58) Field of Classification Search
CPC . G05B 15/02; H04L 12/2807; H04L 12/2816; H04L 12/282
USPC ........................................................ 324/124
See application file for complete search history.

(56) References Cited

U.S. PATENT DOCUMENTS

| | | | | |
|---|---|---|---|---|
| 6,603,301 B2* | 8/2003 | Benes | ................ | G01R 19/0092 324/115 |
| 6,909,921 B1* | 6/2005 | Bilger | .................... | G05B 15/02 700/14 |
| 8,554,376 B1* | 10/2013 | Matsuoka | ........... | H04L 12/2825 236/46 R |
| 2012/0167026 A1* | 6/2012 | Hickam | ................. | G01R 1/203 716/110 |
| 2012/0169249 A1* | 7/2012 | Loveland | ........... | H05B 37/0245 315/291 |
| 2013/0245849 A1* | 9/2013 | Paul | ........................ | H02J 3/14 700/295 |
| 2014/0266669 A1* | 9/2014 | Fadell | .................. | G05B 19/042 340/501 |

(Continued)

OTHER PUBLICATIONS

Electronics Tutorials, "Op-amp Comparator", Feb. 2018 (accessed from https://www.electronics-tutorials.ws/opamp/op-amp-comparator.html on Jul. 23, 2018). (Year: 2018).*

*Primary Examiner* — Kenneth M Lo
*Assistant Examiner* — Michael J Huntley
(74) *Attorney, Agent, or Firm* — Jeffrey S. LaBaw; Robert Sullivan; Feb R Cabrasawan

(57) ABSTRACT

A set of assumptions about scheduled settings in a home automation system which control devices in a home is provided. An input from a sensor coupled to the home automation system is received. The input indicates that activity has occurred in the home. Suggestions in the user interface are presented for changing a first assumption of the set of assumptions based on the input. The first assumption is for controlling a device separate from the sensor which produced the input.

18 Claims, 13 Drawing Sheets

(56) References Cited

U.S. PATENT DOCUMENTS

| | | | |
|---|---|---|---|
| 2015/0149781 A1* | 5/2015 | Logue | H04W 52/0212 |
| | | | 713/171 |
| 2015/0227118 A1* | 8/2015 | Wong | G05B 15/02 |
| | | | 700/44 |
| 2015/0280410 A1* | 10/2015 | Elberbaum | H02G 3/18 |
| | | | 361/679.01 |
| 2015/0355649 A1* | 12/2015 | Ovadia | G05D 23/1917 |
| | | | 704/233 |
| 2016/0139575 A1* | 5/2016 | Funes | H04L 12/2834 |
| | | | 700/275 |
| 2016/0149721 A1* | 5/2016 | Wakeyama | G08B 13/19658 |
| | | | 455/414.1 |
| 2016/0183695 A1* | 6/2016 | Veron | A47D 9/00 |
| | | | 340/573.1 |
| 2016/0187127 A1* | 6/2016 | Purohit | G08B 29/04 |
| | | | 702/150 |
| 2016/0274611 A1* | 9/2016 | Amer | G05F 1/66 |
| 2016/0299256 A1* | 10/2016 | Modi | G01W 1/10 |
| 2016/0302284 A1* | 10/2016 | Herman | H05B 37/0218 |
| 2016/0316293 A1* | 10/2016 | Klimanis | H04L 12/2823 |
| 2017/0108236 A1* | 4/2017 | Guan | F24F 11/0012 |
| 2017/0234562 A1* | 8/2017 | Ribbich | F24F 11/0012 |
| | | | 700/277 |

* cited by examiner

METHODS AND SYSTEMS FOR MINDFUL HOME AUTOMATION

TECHNICAL FIELD

Various embodiments relate to methods and systems for home automation.

BRIEF SUMMARY

According to this disclosure, a method, apparatus and computer program product for home automation is described. A set of assumptions about scheduled settings in a home automation system which control devices in a home is provided. An input from a sensor coupled to the home automation system is received. The input indicates that activity has occurred in the home. Suggestions in the user interface are presented for changing a first assumption of the set of assumptions based on the input. The first assumption is for controlling a device separate from the sensor which produced the input.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

DETAILED DESCRIPTION OF THE DRAWINGS

Figure 1:
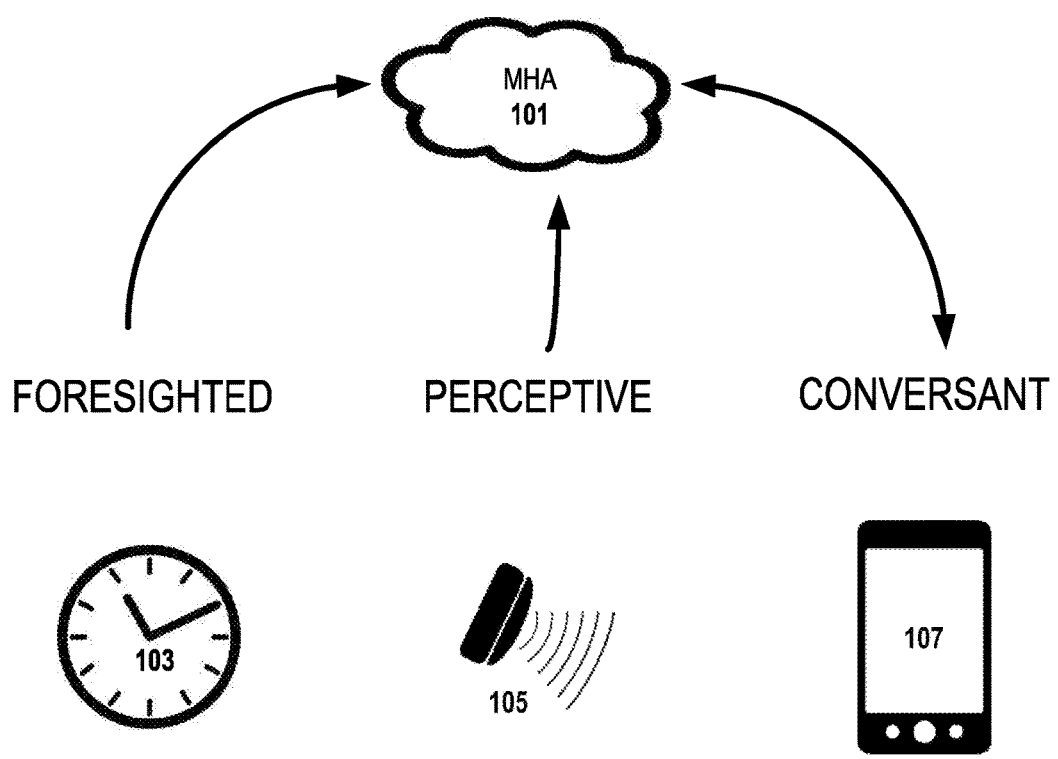
FIG. 1 shows a schematic of the Mindful Home Automation (MHA) according to some embodiments of the invention.

The following detailed description refers to the accompanying drawings. The same or similar identifications may be used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

Various embodiments disclose methods and a system for home automation as described below. In some embodiments, the system is referred to as an MHA system, Carson, or both.

At a high level, a "Mindful Home Automation" (MHA) system is shown in FIG. 1. The MHA programming 101 is cloud based in a preferred embodiment, and further comprises a system of devices, software, natural-language interface, and logic that senses conditions and actions in the home. The MHA controls appliances, e.g., furnaces, A/C, lights, coffee/hot-water pots and entertainment systems, within the home.

Smart devices and other devices that have tasks which have been scheduled by the user allow for "foresight" input 103 to the MHA. The scheduled tasks provide indications to the MHA of intended times for intended actions. For example, the user can program when their smart alarm clock will sound in the morning and the time that their smart coffee maker should start brewing coffee. In this way, the scheduled events provide advanced notice of such events and are used to take actions for other appliances in the home automation system.

The MHA also takes action based on real-time sensors, which is called "perceptive" input 105 in some embodiments of the invention. Perceptive input 105, is used by the MHA to notice constant or changing conditions around the house. This input may be used to change the assumptions made in view of the "foresight" input, or make new assumptions, and the MHA takes action based on the sensed conditions and assumptions. The MHA uses the variety of sensors employed in the system to provide perceptive input, such as motion, light and sound sensors, and takes appropriate action for appliances in the home automation system.

An MHA app is provided on a smartphone 107 or other device to allow the MHA to be "conversant" with the user. In preferred embodiments of the invention, the MHA uses a conversation engine to inform the user about new assumptions which it has made based on the behavior of the user, so that if ratified by the user, it may update the MHA assumptions which are used to schedule actions in the home automation system. The conversation engine can also be used to provide a set of initial settings through a dialog with the user.

The MHA controls appliances without the need to program the home-automation system, although in some embodiments of the invention the user is allowed to program the MHA. It reacts in real-time to user actions such as the user going to bed to perform actions on the home appliances. By inferring actions based on settings for given appliances (foresight), observed events (perception) or actual choices made by the user (conversation), the set-up and maintenance of the MHA is much more user friendly than prior art systems.

Figure 2:
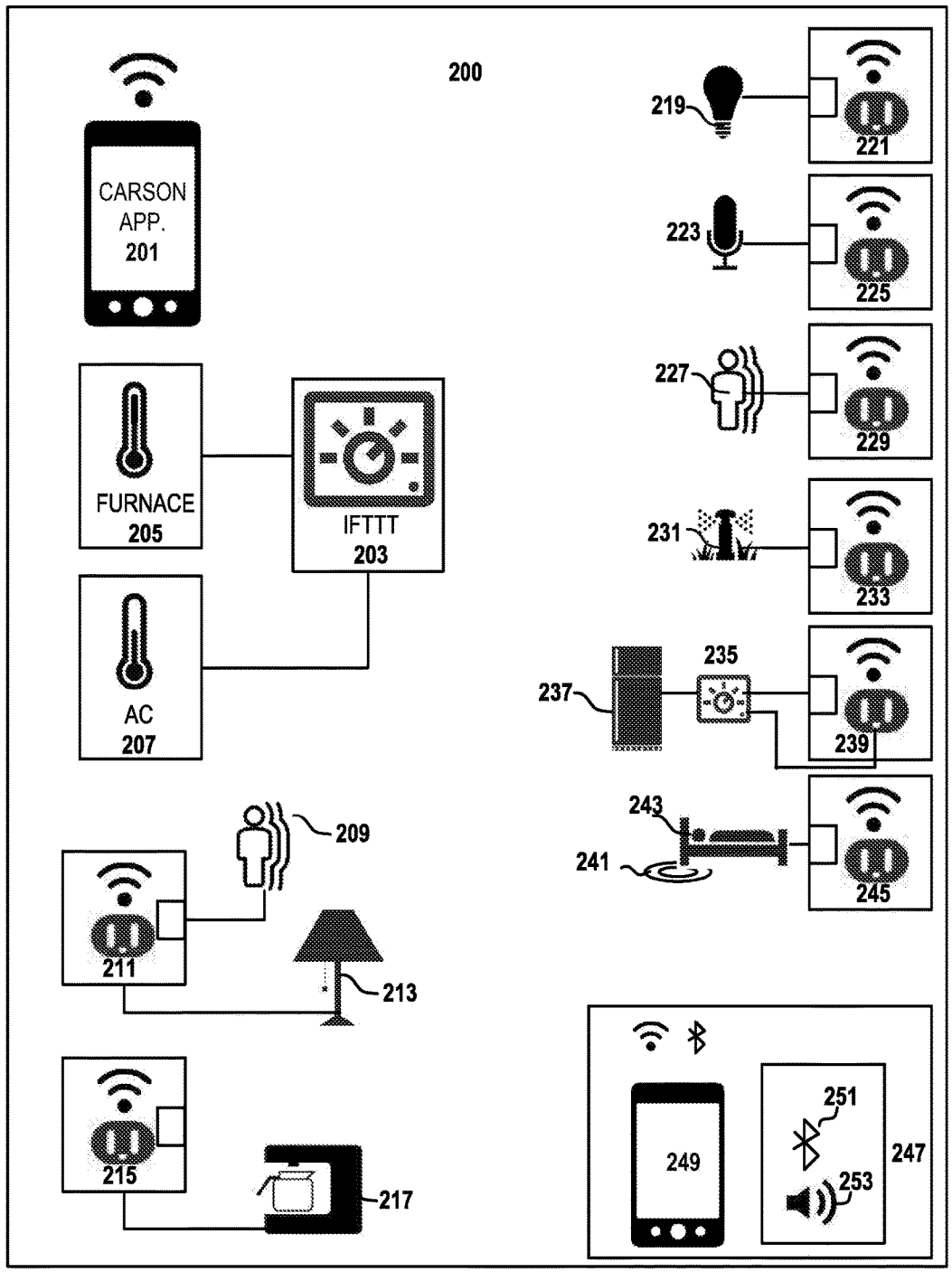
FIG. 2 shows examples of components, such as detectors, that assist the MHA to identify conditions in a house.

FIG. 2 shows examples of components, such as detectors which assist the MHA to identify conditions in a house.

Smarter Plug Sensors

In the system, many of the home appliances and various sensors interface to a modular smarter plug. The "Smarter Plug" is described in detail in association with FIG. 3 and FIG. 11. In some embodiments, a Smarter Plug is engineered to support a wide variety of sensors, with varying voltage and voltage readings. The smarter plug devices 211, 215, 221, 225, 229, 233, 239 and 245 have a set of capabilities in a preferred embodiment. The smarter plug device is able to determine that another device plugged into the smarter plug is off or on. Either through the home automation system or through intelligence incorporated into the device, a smarter plug device can initiate a text to the user. For example, if connected to a washing machine, it could text the user when the washing machine finishes its cycle. The smarter plug can detect that a physical circuit is open or closed. In a preferred embodiment, the smarter plug can turn on a light when the automated system shut it off without interacting with that automated system. The smarter plug also can incorporate the capabilities of any sensors which are plugged into it. For example, if a motion sensor is plugged into the smarter plug, it can detect that someone is present, and if that presence violates the user's normal schedule, send a text to a user about a possible detected breaking and entering.

Smarter Motion Detector

Another component of a preferred embodiment of the invention is a "smarter" motion detector 227. In addition to detecting motion, it can be programmed to turn on a particular lamp, not necessarily one that the motion detector is incorporated into. With a smarter motion detector, the system can determine that people are up and that actions should be taken. A motion detector supplements a scheduled home automation system by determining that people are not away at work as scheduled, and that a variance to the normal schedule is indicated.

Smarter Sound Detector

Another component of a preferred embodiment of the invention is a "smarter" sound detector 223. The detector can detect events in the home such as an alarm clock sounding, or that the people are up and are not away at work. Other events having to do with visitors to the home such as a doorbell ring can cause programmed actions to be taken. Further, detecting a specific sound such as a "clapping" sound can be used to turn appliances or lights on and off in the house, e.g., "clap on, clap off".

Smarter Button

Another component of a preferred embodiment of the invention is a "smarter" button detector 209. An optional component of the smarter button is a motion detector. By actuating the button 209, a user can perform actions such as turn a device off or on, or in the case of a lamp, dim or brighten a lamp. An embodiment of the smarter button is described below with reference to FIG. 10.

Smarter Pressure Sensor

Another component of a preferred embodiment of the invention is a "smarter" pressure sensor 241. When placed under a piece of furniture, the MHA will be informed whether anyone is currently on the furniture. In the case of a bed, the MHA will know when they rise in the morning, know when they go to bed and know how many people are in the bed. Household actions can be performed by the MHA such as changing the thermostat temperature setting. The users may prefer a different temperature in the Awake, Asleep, or Away times and possibly on particular days. The operation of a smarter pressor sensor is described in greater detail below with reference to FIG. 12.

Smarter Amperage Meter

Another component of a preferred embodiment of the invention is a "smarter" amperage meter 235. It can monitor electric use by appliances, e.g., to determine that the washing machine just finished. The MHA can be programmed to text the users if an appliance has shut off as signaled by the smarter amperage meter.

Smarter Moisture Detector

Another component of a typical embodiment of the invention is a "smarter" moisture sensor 231. The smarter moisture sensor can detect a leak or turn on irrigation if the moisture sensed is low.

Smarter Thermostat

Another component of a preferred embodiment of the invention is a "smarter" thermostat 203. It can detect temperature events, e.g., freezing pipes. The smarter thermostat is used to control the furnace 205 and air conditioning 207.

Smarter Controller

Another component of a preferred embodiment of the invention is a "Smarter" Controller 231 used for controlling 24 V Controller systems. For example, the "smarter" controller can be programmed for turning on sprinkler systems.

Smarter Coffee Maker

Through the MHA, an inexpensive, regular coffee maker with a manual switch can be converted into a "smarter" coffee maker by plugging the coffee maker 217 into a smarter plug 215. In alternative embodiments, a "smarter" coffee maker having a self-programming capacity can be employed in a given installation. The user can select the regular coffee maker from among the many brands from which to choose. The regular coffee maker turns on when the switch is on and then power is applied by the MHA through the smarter plug. The programming though the MHA for when to begin brewing coffee is easier to program than most automated coffee makers.

MHA App

In a preferred embodiment, the MHA is programmed by an intuitive and easy-to-use app 201. As the app is a common interface for all the MHA components, the user avoids needing to learn push-button programming for each appliance. In some embodiments of the invention, the user does not need to converse with the MHA or set a schedule through the app, although this option is available. As the coffee maker is integrated into the MHA, the user never needs to set the time for each appliance. The MHA knows the time for the coffee maker and can make "assumptions" regarding the other appliances.

The coffee maker, or other appliance can be combined with a Smarter Button to manually turn it on and off. For example, using the app, the user can create an MHA "Assumption" to turn on the coffee maker fifteen minutes prior to the alarm clock alarm time setting, thus linking two appliances within the MHA. In another embodiment, the alarm clock itself does not need to be programmed by the user; the user can tell the MHA when they intend to rise.

In preferred embodiments of the Mindful Home Automation (MHA) system, there are a plurality of smart controllers, real-time sensors, and controllable ("smart") devices. In embodiments of the invention, cloud computing is used to provide at least some of the intelligence of the system. A Smart app 201 using "If that, then this" (IFTTT) interfaces 203 which the user can access via a smartphone or tablet provides the user interface in some embodiments. Alternatively, a web page linked to a laptop, and/or the Mindful Home Automation program is used to provide the user interface in other embodiments.

Examples of smart controllers include smart thermostats such as Nest and Lyric which can be used to control the heat 205 and air conditioning 207. Other smart controllers are used in alternative embodiments. Real-time sensors are used to trigger a variety of tasks based on time of day and sensed conditions, e.g., alarm-time setting on smart-alarm clock app, time-setting on a smart coffee maker, time-setting on a dumb-automated coffee maker, controlling lights. Sensors include sound, amps (appliance usage), pressure (number of people in a bed), on/off button, dimmer dial, smart thermostat temperature setting, and leak detector.

The MHA will use whatever set of these sensors is available in the home automation system. The use of the sensors can improve the MHA's "mindfulness". The term "mindfulness" is used periodically to express the idea that monitoring the present conditions in the home can be used to adapt scheduled tasks or execute unscheduled tasks which are programmed in an IFTTT basis in the MHA. Smart devices allow for "foresight" input, i.e. scheduled MHA tasks by providing indications to the MHA of intended times for intended actions. For example, the user can program when their smart alarm clock will sound in the morning and the time that their smart coffee maker should start brewing coffee. In this way, the scheduled events provides advanced notice of such events and are used to take actions before taking action based on real-time sensors, and unless the real-time sensors indicate that a change in the schedule is in order. For example, a scheduled event would be to turn up the thermostat so it will be at the target temperature at the time the users intend to rise.

Figure 3:
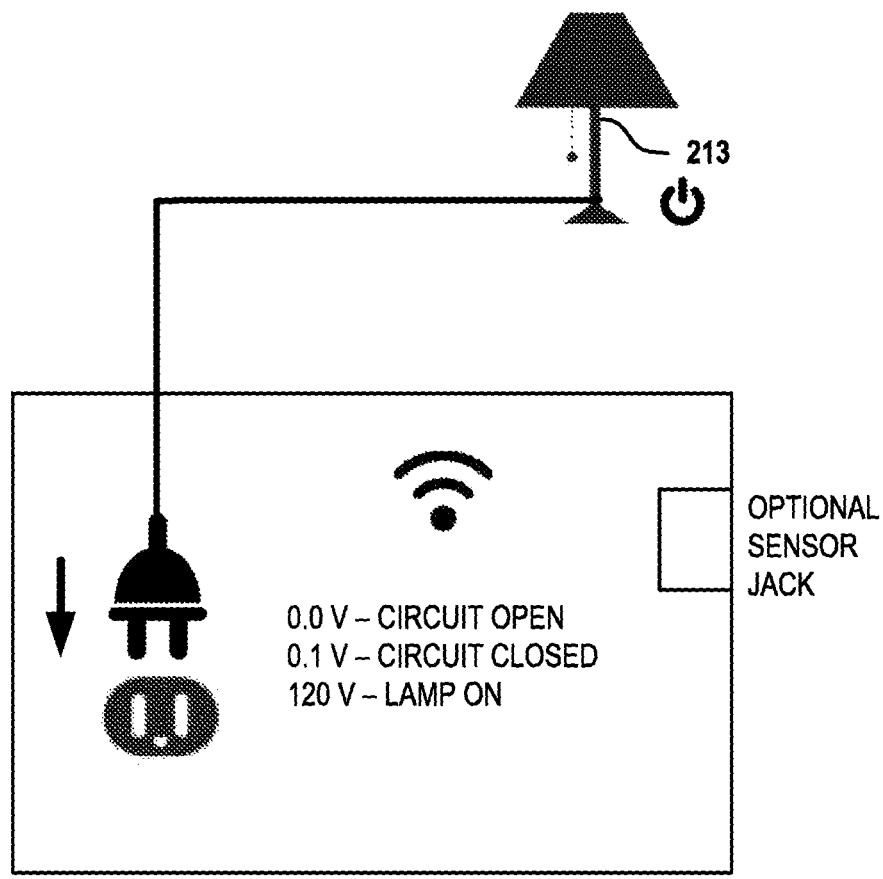
FIG. 3 shows a smarter plug that a homeowner can use to override a setting of the MHA according to some embodiments of the invention.
Figure 11:
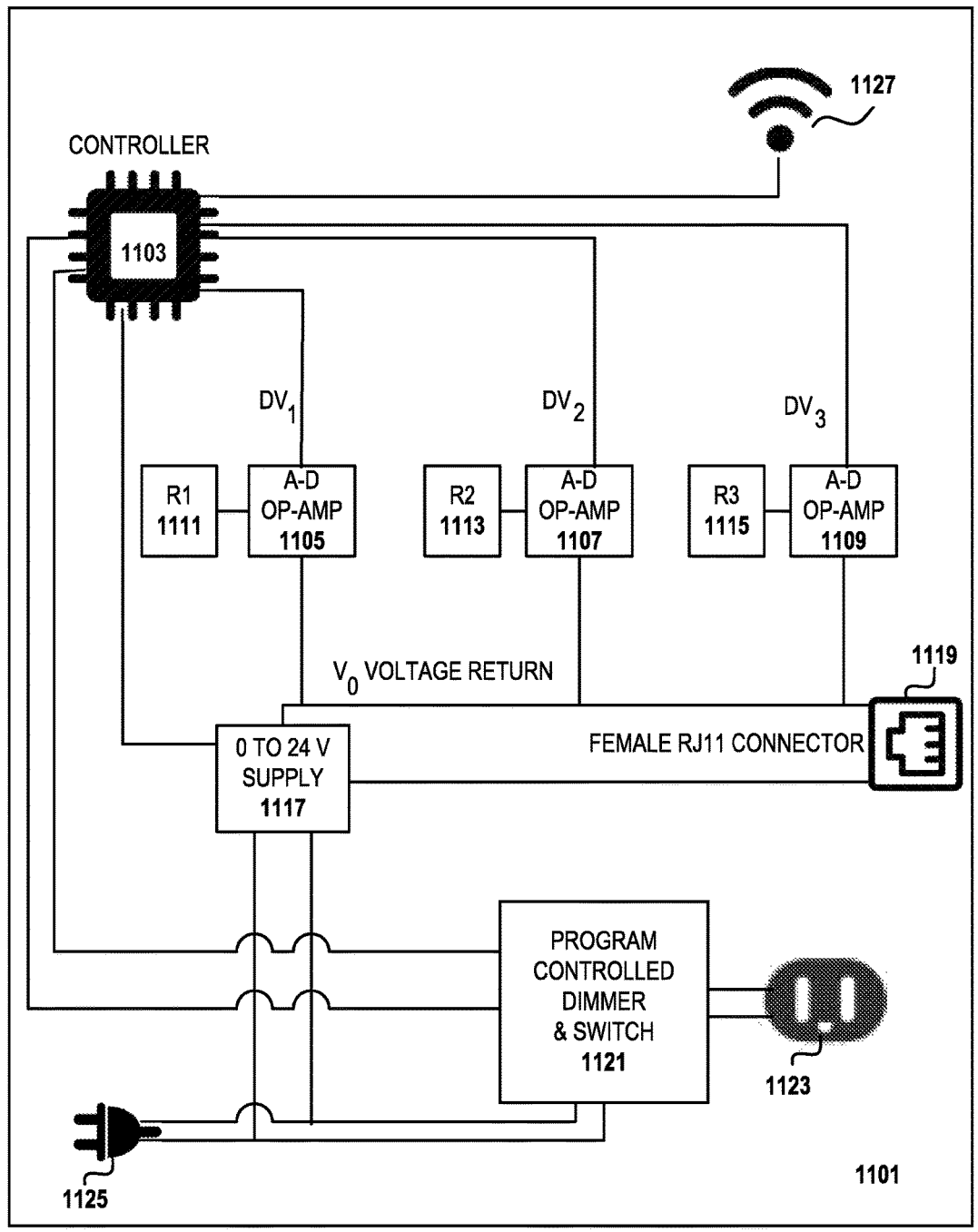
FIG. 11 shows a schematic of a Smarter Plug according to an embodiment of the invention.

In embodiments of the invention, a "Smarter" plug is used. Some of the modes of the smarter plug are shown in FIG. 3. One embodiment of the smarter plug circuitry is shown in FIG. 11. The smarter plug can be used for scheduled tasks such as turning appliances or lights on or off or to dim lights or appliances (restrict power) at scheduled times. The smarter plug can also be used to sense a plugged in appliance's state, e.g., an on/off state. The smarter plug can detect closed and open AC circuits by providing a small voltage to detect that lamp or appliance switch is turned on or off. For example, by detecting a predetermined sequence, such as turning the lamp switch on twice in quick succession, a smarter plug can override a scheduled "off" MHA event with a "Smarter Plug Auto-Off Override", turning on the lamp when the MHA has scheduled it to be off through the smarter plug.

Any of the modular sensors described in connection with FIG. 2 can be connected to a smarter plug. In one preferred embodiment, the sensors use a range of zero to 24 V sensor voltage supply coupled to three op-amp A-D voltage meters. Using the three different op-amp resistor values, the smarter plug reports three sensor-voltage slopes: a first sensor-voltage slope with higher sensitivity and lower range, a second sensor-voltage slope with lower sensitivity and higher range and a third sensor-voltage slope with a range and a sensitivity intermediate between these ranges. The smarter plug detects sharp drops to zero volts indicating an On/Off event. If the smarter plug detects pulses, it indicates dimming. The smarter plug maintains a lower voltage when short pulses detected; it raises voltage when longer pulses detected. In one preferred embodiment, the "dim" state is not maintained, but the plug increases or decreases voltage until person stops turning the dimmer dial. A smarter plug also detects an appliance is drawing amperage. Based on the amperage drawn, the smarter plug can determine whether the appliance is on or off.

In preferred embodiments, the smarter plug interfaces to home-automation controllers over a wireless network. Typical operating parameters for a smarter plug would be AC: Max 120V~/16 A/60 Hz/1800 W, however, the operating parameters will depend on the electrical parameters of the locale in which the MHA is sited. A 4-prong RJ-11 jack is included in some embodiments to drive and sense external devices so equipped. The RJ-11 jack supports common modular wired-phone connectors and wires. Using a RJ-11 jack carries the advantages of being inexpensive and easily available. Cables are available in multiple lengths and female-to-female connectors to plugin sensors or extend length. Long wires are used to enable placing sensors far from the Smarter Plugs.

In an example application, a smarter plug is used to detect that a home entertainment system was turned on, and in response, the MHA dims the lights to an ideal HDTV viewing level. The smarter plug senses the appliance on/off state; in this case, a home entertainment system. The smarter plug invokes an MHA assumption to dim the lights when the home automation system is on. This is possible as the lights are plugged into smarter plugs. In preferred embodiments, smart plugs and wall switches provided by other manufacturers can be used in an MHA installation. As another application, the smarter plug is used to manage a 24V controller system, for example, to control automated sprinkler systems.

Figure 4:
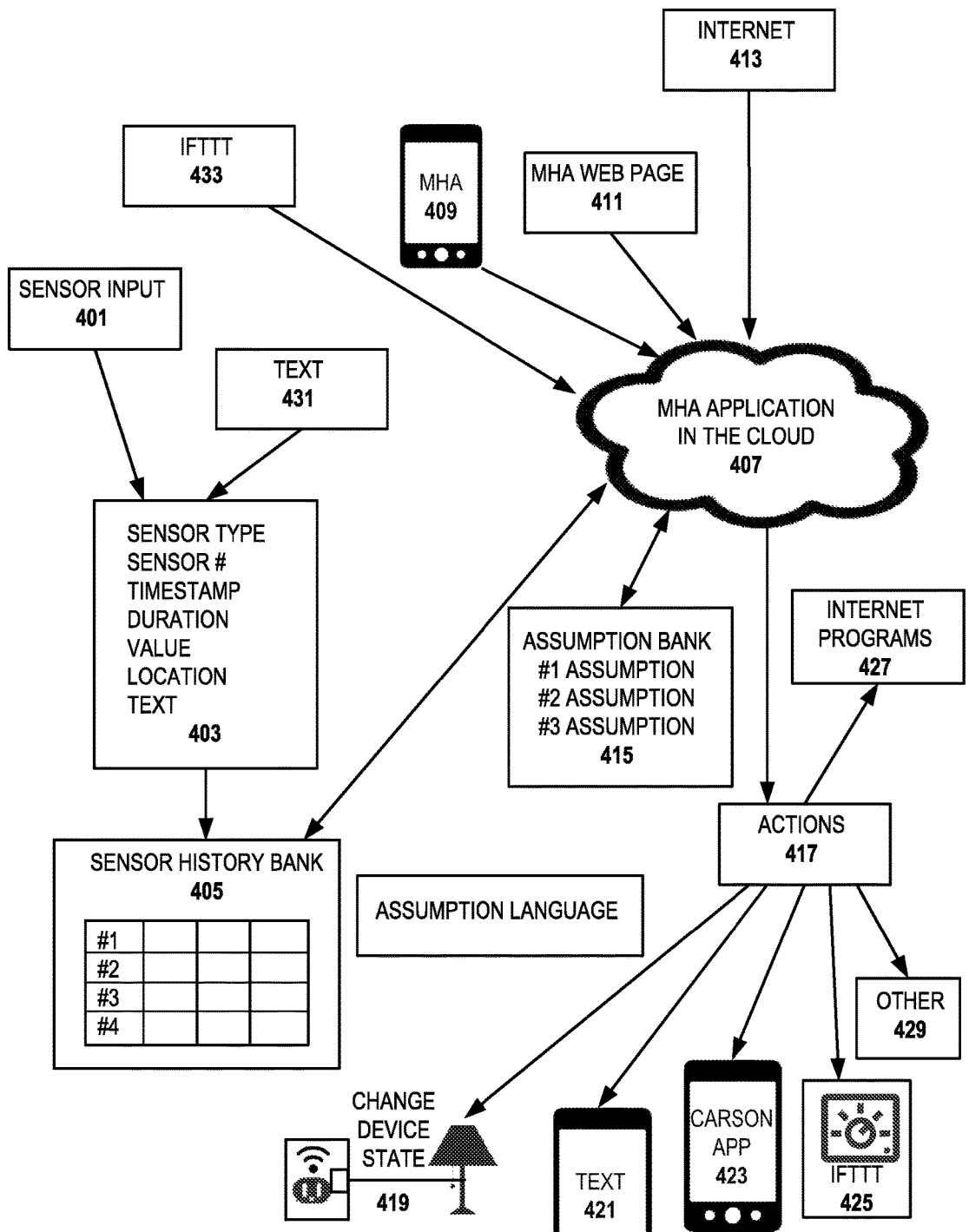
FIG. 4 shows a schematic of the MHA Assumption Engine according to some embodiments of the invention.

In FIG. 4, a Mindful Home Automation logic flow is illustrated. A real-time sensor input 401 sends an update 403 to the Sensor and State History Bank 405. In a preferred embodiment, the update 403 contains the following information: Sensor type, Sensor number, Timestamp, Duration, Value, Location and Text. The update 403 is entered into the sensor and state history bank 405 as the latest state of the sensor. In a preferred embodiment, a history of the last X states is kept in the sensor and state history bank 405.

As shown, the MHA application 407 receives an update from the sensor and state history bank 405. Preferably, the MHA application 407 is written in a high-level language such as Java or C++. In addition to receiving input from the sensor and state history bank 405, the MHA application receives input from the MHA app 409, the MHA web page 411 and IFTTT commands as well as other input from the Internet 413. The MHA reads and writes to the sensor and state history bank 405 as well as reads and writes to the assumption bank 415. Based on the readings from the sensor and state history bank 405 and the MHA assumptions in the assumption bank 415, the MHA application 407 takes action 417. As shown, the action 417 can take several forms. The action 417 can be to change the device state via a smarter plug 419. The MHA application 407 can send a text 421 to a smartphone. Alternatively, a message 423 can be sent to the MHA app 423 on a smartphone. The MHA application 407 can send instructions to a smart controller such as a smart thermostat 425. The MHA 407 can interface with other Internet programs 427 or take other actions 429.

Further, the MHA 407 can receive texts 431 from the user. The text 431 can take the form of an update 403 for a particular sensor or other component of the home automation system. Alternatively, the texts can be in the form of an IFTTT command 433, or a type of interchange described below in connection with FIG. 6.

Figure 6:
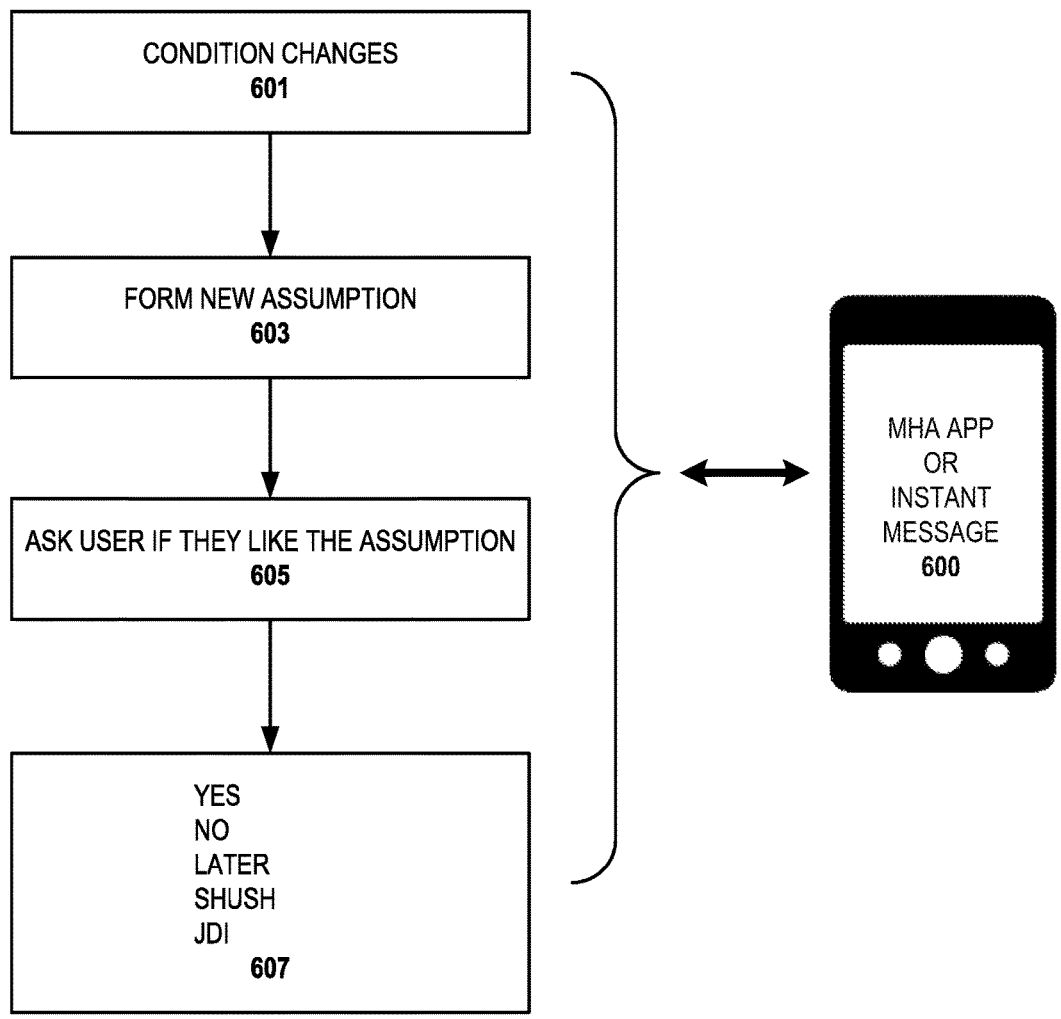
FIG. 6 shows that, in some embodiments, the MHA uses a conversational interface to check with a user when it is changing an assumption.

As discussed further in association with FIG. 6, the MHA sends queries to confirm new assumptions. If a condition has changed in the home network, the MHA forms a new assumption concerning the changed condition. In preferred embodiments, rather than simply implementing the new assumption, the MHA asks the user whether they approve of the new assumption. The user can make a natural language type of response accepting, rejecting or delaying a decision on the assumption. In alternative embodiments, a conventional user interface can be displayed, e.g., using check boxes. As an example query, in response to sensing a user arriving home at 6 PM at a new time, the MHA might ask "Shall I assume you will arrive home at 6 PM on weekdays?"

In preferred embodiments, the MHA can interact with the user with the MHA app and/or the MHA web page. The MHA sends IFTTT messages to smart controllers and other IFTTT entities in the network.

In preferred embodiments, the assumptions stored in assumption bank 415 shown in FIG. 4 are in a format understood by the MHA. Each assumption has an assumption number and the assumption uses an if-then format, e.g., if (logical function) then (multiple actions) else (multiple actions). A logical function returns TRUE or FALSE; the type of logical function includes the types of functions found in many spreadsheets. The list of assumptions forms the assumption bank 415.

Some example assumptions which might be stored in the assumption bank 415 are described below. "If Infrared #1 is HIGH, then turn on Smarter Plug #1." This assumption means that if motion (infrared #1) is detected, turn on a lamp which is proximate to the detected motion (connected to smarter plug #1). Another example is: "If button-pulse #3 is sensed, then change state of Smarter Plug #5." The change of state can be Off to On or On to Off. The assumption would translate to, "If the tabletop button pressed, then turn the lamp on/off." Another example assumption is "If dial #6=new value, then adjust Smarter Plug #5 AC output." The assumption would translate to, "If they turn the dial connected to the lights, dim the light(s)." Another MHA assumption is "If Sound #1=High Value, then set state to awake."

If the event creates a new assumption, the MHA can store the time that this event occurred in the history bank as a new state. The assumption can translate to "If their dumb radio-alarm clock sounds, then they are rising." Another assumption is "If Alarm-Clock #2 set to <time>, then set Awake-begin time to <time–x>." The X represents a time for the house temperature to rise to the Awake temperature. For example, the assumption could translate as: "If they set their Smart Alarm Clock App to ring at 6 AM, then turn up the furnace at 5 AM." Another similar assumption is "If Alarm Clock#3 is set to <time>, then turn on Smarter Plug #4 at Time–30 minutes." which translates as "Turn on the coffee maker shortly before they rise."

Other example assumptions include: "If <list of recent sensor actions=TRUE>, then set to Awake mode for 30 minutes." Or "Do not turn down the thermostat prematurely (before they go to bed)."

A set of assumptions can be categorized as "Asleep, Awake, Away" assumptions or "AAA" assumptions. These assumptions cover the range of situations where the user is expected to be in an Asleep, Awake, or Away state and what actions should be taken. These assumptions can be scheduled or taken in response to a sensed event. For example, an AAA assumption is "If Time=6 AM then set AAA to Awake." The users plan to rise at 7 AM. And so, this assumption turns up the heat in time for it to be at the target temperature. Another example is "If Time=5 PM then set AAA to Awake." The users are expected to come home at 6 PM. For appliances which do not require a warm up period, the AAA assumption can be "If Time=6 PM then set AAA to Awake" for a 6 PM return time by the user.

The MHA sets AAA temperatures and assumptions in a preferred embodiment of the invention. For example, if thermostat temperature changed at a new time, but at a time is user is scheduled to be asleep or close to, but before, sleep-time, the MHA uses a conversation engine to update the Asleep temperature assumption. As described above, in a preferred embodiment, the MHA confers with the user before the MHA makes the change to the assumption. If thermostat temperature changed at a new time, and the MHA is in an Awake mode, it is possible that the user wants a new temperature to be scheduled. The MHA uses the conversation engine to update the Awake temperature assumption for the new time. If the thermostat temperature changed at a new time, and the time is close to a scheduled Away mode, it is possible that the user's schedule has changed and a new Away time or temperature is desired. The MHA uses the conversation engine to update the Away time or temperature assumption.

In preferred embodiments of the invention, the MHA can be set in an overriding assumption mode. If the MHA is set in the overriding assumption mode, the assumption is to not bother the user with the conversation engine when user changes the temperature setting. In this mode, the MHA will modify the AAA assumptions without querying the user. The MHA will log the changes so users can look at them at their leisure.

In preferred embodiments, the AAA assumptions can vary by day of the week. A first temperature on weekdays is set by the weekday AAA assumption. A second temperature is set on Saturdays by the Saturday AAA assumption. A third temperature is set on Sundays by the Sunday AAA assumption. Different temperatures can be set on each particular day of the week by the particular AAA assumption.

In the preferred embodiments, the MHA is a "mindful" program. The inventor characterizes the MHA as "foresighted", "perceptive" and "conversant" and has illustrated some examples of MHA operations in FIGS. 5-10. The MHA is "foresighted" in that it "knows" a certain number of assumptions about users rather than "learns" and does not need explicit user programming.

Figure 5:
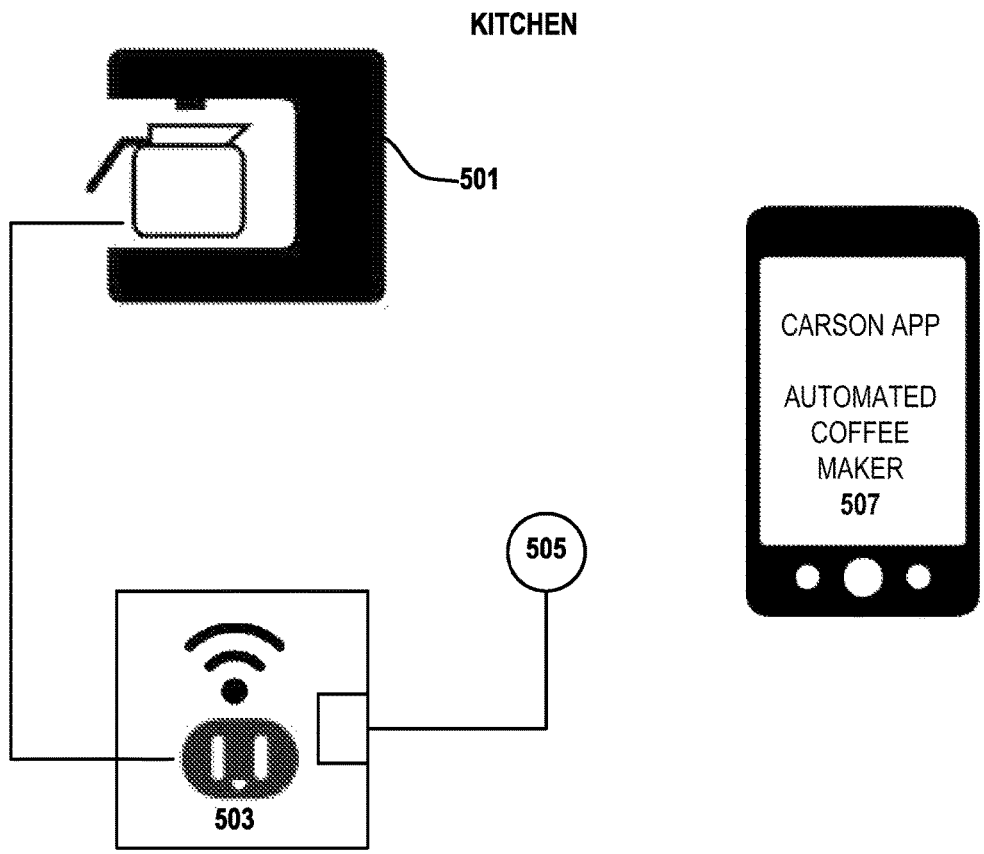
FIG. 5 shows two examples of appliances that supply to the MHA information of a user's intended wait time according to some embodiments of the invention.
Figure 5:
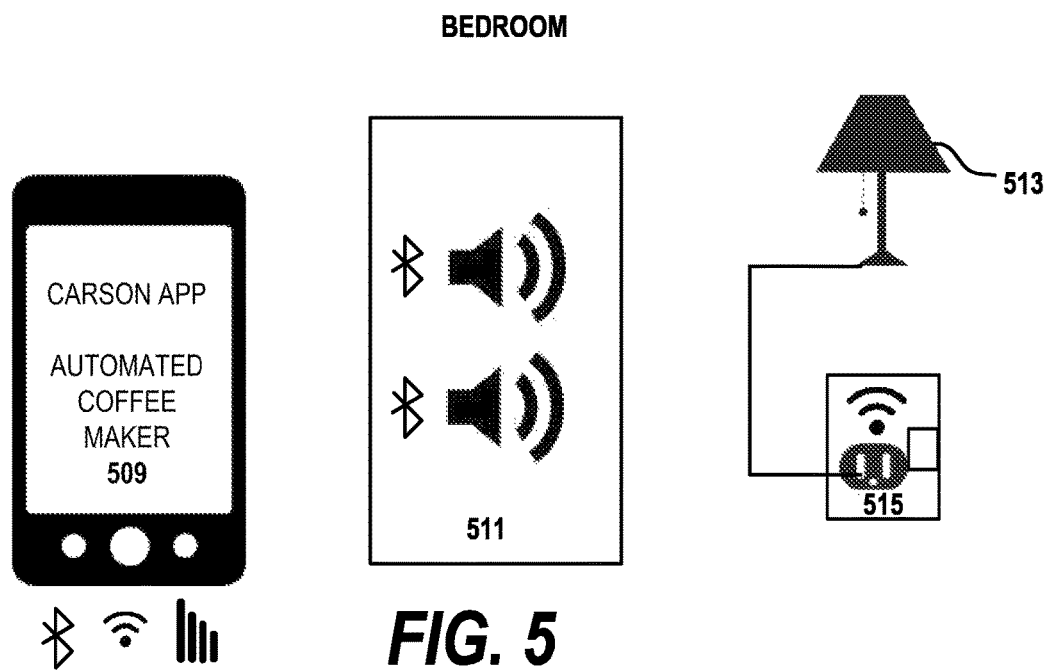

For example, as illustrated in FIG. 5, the MHA knows when the user intends to rise in the morning by monitoring the user's scheduled actions. That is, the MHA uses the schedules about things that the user sets that tell the MHA about when the user, most likely, will rise in the morning, and therefore, actions which should be taken on other devices, i.e. appliances other than the ones which the user has scheduled. For example, the alarm time the user sets for the time for the smarter coffee maker 501 to start brewing. The time can be set by programming the smarter coffee maker 501, by programming through the smarter plug 503, by actuating a smarter button 505 associated with the coffee maker 501 or by programming the smarter coffee maker 501 or smarter plug 503 through the user interface of the MHA app resident on a device such as a smartphone 507. To further the example, suppose that the smarter coffee maker 501 was set to a new time 5:15 AM on the MHA app on the smartphone 509. Using an assumption, the MHA would adjust the time for the alarm clock 511 which would play the users' favorite playlist from any of a plurality of music sources such as iTunes, Google play Music, Spotify, Pandora and FM-Internet. The MHA will also raise the lighting 513 connected to a smarter plug 515 in response to the change in the coffee maker time as part of another assumption.

Thus, the MHA does not need to be told a schedule for every connected device and no explicit user programming is required. However, in embodiments of the invention, an optional app interface is provided to manually adjust settings. Should the user decide to rise at a different time, the MHA can sense that too. A change to the smarter radio alarm clock or the smarter coffee maker time or other devices can be reflected in changes to other components controlled by the home automation system.

The MHA is "perceptive" in that it notices constant or changing conditions around the house, makes assumptions, and takes action based on the conditions and assumptions. The MHA uses the variety of sensors employed in the system, e.g., with eyes (cameras), ears (microphones), tactile sensors, motion detectors, appliance usage sensors, and the smart thermostat. A list of possible sensors is discussed above in connection with FIG. 2. Rarely will a particular home automation system have all of the possible sensors, so the MHA will not have access to all of these types of sensors. The MHA uses the sensors located in a particular home.

The MHA is "conversant" by communicating in a natural language user interface and by notifying the user about proposed changes in assumption in preferred embodiments of the invention. As discussed elsewhere, the MHA tools are "foresighted" (knows when actions have been taken in the past) and "perceptive" (notices when actions change). In addition, the MHA knows the user's current preferences and knowledge of responses the user made to prior suggestions for altering assumptions. Using those tools, the MHA makes proposals to the user by communicating in a natural language user interface proposing to alter some of the current assumptions and asks the user if the user agrees, disagrees, or has other suggestions.

In preferred embodiments, the MHA communicates with the users through instant messaging. As shown in FIG. 6, the MHA sends queries to confirm new assumptions. In step 601, a condition has changed in the home network. In response, the MHA forms a new assumption concerning the changed condition, step 603. In step 605, the MHA asks the user whether they approve of the new assumption. Block 607 illustrates the type of responses that the user can make in a natural language type of response. For example, the MHA instant messages proposed assumption changes to the user. Replying to one of the MHA proposals is as easy as replying:

"Yes." The MHA incorporates the new proposal.
"No." The MHA does not use the new proposal.
"Later." The user will get back to the MHA with the MHA app.
"Shush." Do it and don't ask me about this subject again.
"JDI." (Just do it). Stop asking me about new assumptions.

In a preferred embodiment, users can communicate with the MHA though an intuitive app that works with smart devices (iOS or Android) and web pages. Users can use this app to give MHA more detailed instructions than afforded by the instant messaging interface. For example, the app can be used when the user replied "Later" to one of the MHA proposals to alter an assumption. The app can display the status of system components and current assumptions. The user can add or update the assumptions or other settings.

Since the MHA keeps track of being told "no" several times, the MHA will stop suggesting a particular assumption. By tracking the accepted and rejected proposals, the MHA will avoid making suggestions similar to those that have been rejected. For example, if the MHA proposed changing the "Asleep" temperature because the MHA noticed the user change the temperature manually during the night, and the user rejected that suggestion, the MHA might ask again. However, if the user rejects the suggestion a second time (or more times), then in preferred embodiments, the MHA will stop asking to change that MHA assumption.

Figure 7:
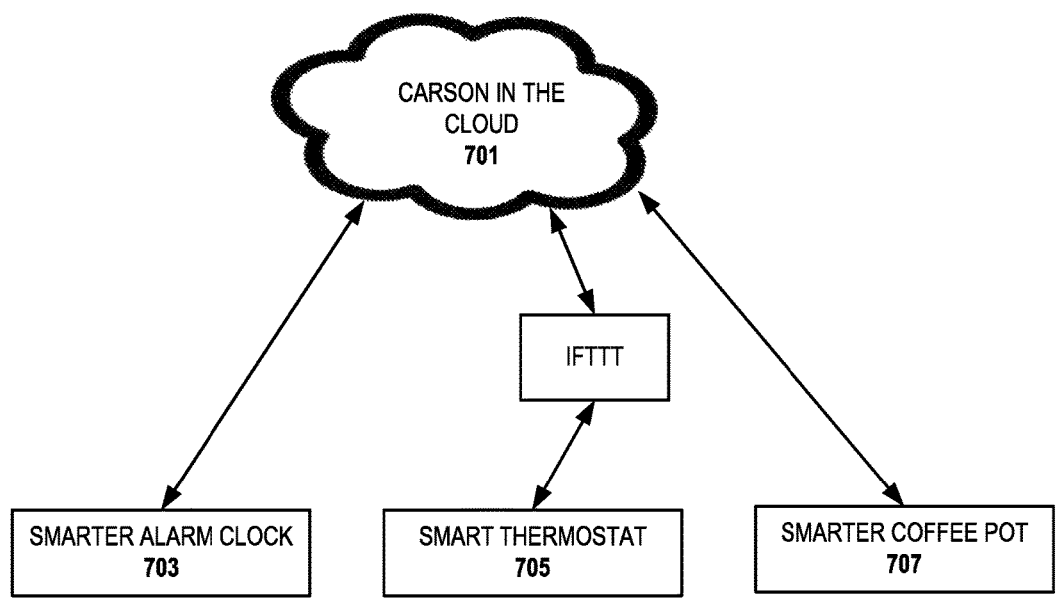
FIG. 7 shows that, in some embodiments, the MHA uses clues such as when the user sets alarms for devices.

In preferred embodiments of the invention, the MHA interfaces with major home automation brands that include proprietary or open APIs. As illustrated in FIG. 7, the "If-This-Then-That" (IFTTT) is an open API which is used in preferred embodiments. As shown in the drawing, in these embodiments, the MHA 701 uses IFTTT to communicate with IFTTT enabled devices such as smarter alarm clock 703, smart thermostat 705 and smarter coffee maker 707. The smarter alarm clock 703 can inform the MHA when the users intend to rise. Smart thermostat 705 can tell the MHA that the user has manually adjusted the temperature, in effect telling the MHA what temperatures the users prefer for Awake, Asleep and Away temperatures and schedules for different days. The smarter coffee maker 707 tells the MHA when the users want coffee, from which their rising time can be inferred according to an assumption. Smart thermostats are often used as the controllers for home automation systems. Smart thermostat vendors could choose to imbed MHA features in the firmware in those thermostats. The MHA can use most of the sensors found in smart homes. It works better when it has the variety of sensors available to sense conditions in the home.

Figure 8:
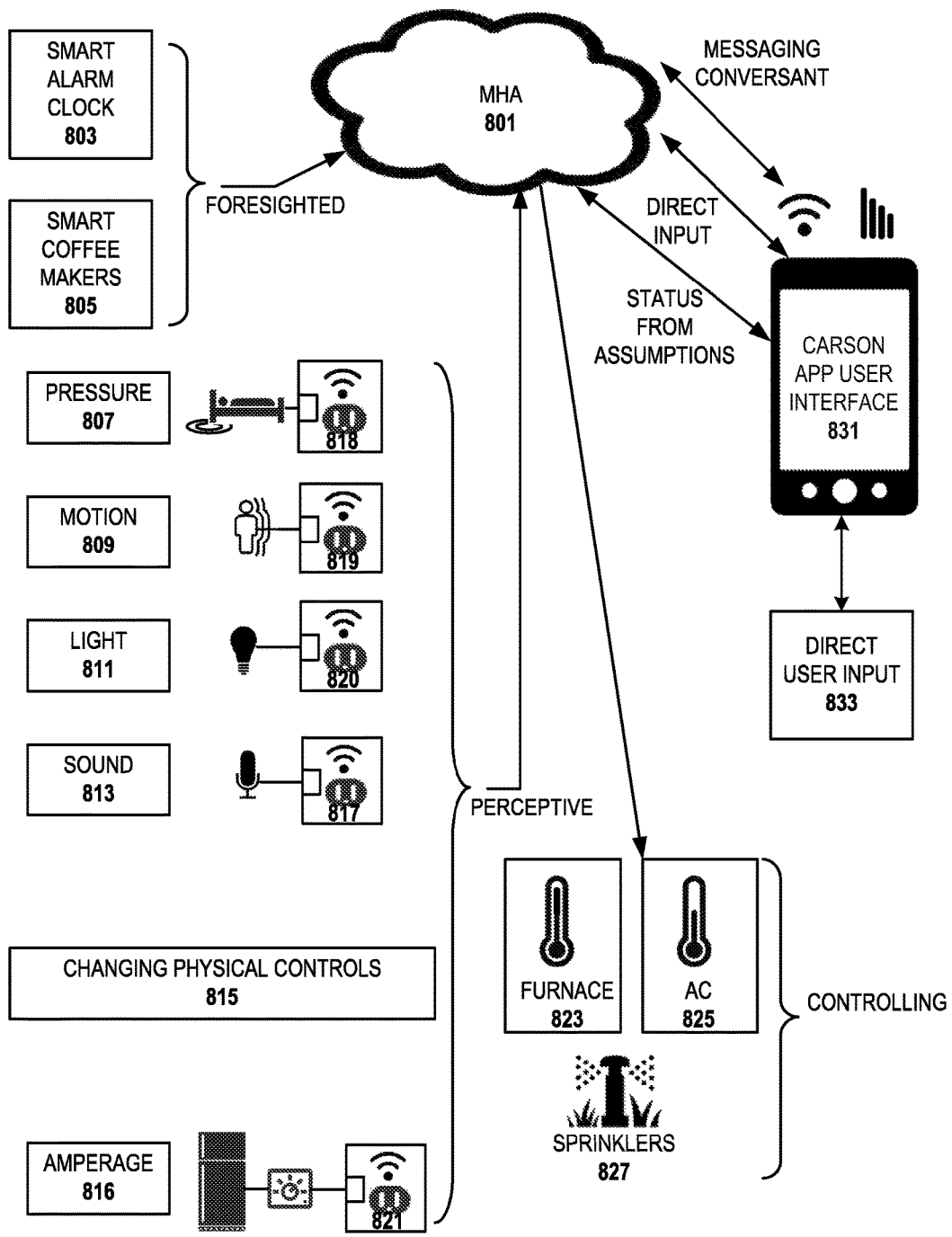
FIG. 8 shows the interplay among input, output, and control in an MHA according to some embodiments of the invention.

FIG. 8 is another illustration of the "Mindful Home Automation" (MHA) system combining aspects of other drawings including FIGS. 1 and 2. The MHA 801 connects a system of devices, software, natural-language interface, and logic that sense conditions and actions in the home to control appliances, e.g., furnaces, A/C, lights, coffee/hot-water pots, entertainment systems. As shown in the drawing, the MHA 801 is a cloud-based program entity, however, in alternative embodiments, the MHA can be embedded in a home automation device like a smart thermostat. MHA capable devices can be used with home-automation systems from multiple companies that support IFTTT and/or proprietary APIs.

Typical conditions, settings and actions sensed by the MHA include smartphone alarm clocks 803, standard alarm clocks, smart coffee pots 805, automated and manual coffee pots, getting into and out of bed (by means of pressure sensor 807), moving around the house (by means of motion sensor 809, and turning on/off lights, TVs, and other appliances, alarms and doorbells (by means of light sensor 811 and sound sensor 813). The MHA 801 "knows" in advance when the user plans to rise by knowing their alarm clock settings. Using a microphone, the MHA 801 can listen for standard alarm clock alarms to know when the user is rising. Another way that the MHA can sense events in the home include changing physical controls 815 of a device coupled to the MHA as a user pushes an on/off switch, adjusts a dial, dims lights or manually controls the thermostat temperature. An amperage meter 816 can detect when an appliance like a washer or dryer turns off. Many of these sensors can be connected to smarter plugs 818-821 which transmit the sensor data to the MHA.

By sensing when an automated coffee maker turns on, the MHA uses an assumption to "know", i.e. predict, when the user is likely to rise. The MHA can also control a non-automated coffee maker to know farther in advance when the users plan to rise. A pressure sensor underneath a bed, or other piece of furniture, allows the MHA to know when zero, one, or two people are in bed, therefore, when the users are retiring or rising. The MHA uses IR sensors to note motion throughout the house to know people are in the house and have not retired. The MHA notes when lights are out or on using a light sensor, to know when people have retired and are active. The MHA knows when other appliances are in use (amp meter) to judge when the users are up or retired.

Based on MHA's sensors and assumptions, the MHA judges when to control the temperature settings of furnaces 823 and air conditioners 825 for maximum energy savings and maximum comfort. For example, in the winter, the MHA turns up the furnace temperature before the user rises in the morning so that the house will be at a comfortable temperature when the user rises. The MHA turns down the temperature when the user goes to bed. The MHA takes similar actions with other appliances such as water sprinklers 827 based on assumptions and real-time sensors.

The MHA 801 controls appliances without the need to program the home-automation system. It reacts in real-time to user actions such as the user going to bed, the user rising in the morning, setting an alarm clock, setting the time for a coffee maker to start brewing coffee in the morning, sensing the movement of the user and/or lights turning on and off. In preferred embodiments, the MHA optimizes control of furnace and AC systems without the need to directly program the smart thermostat and without the need to "learn" people's habits. The MHA turns the furnace and air conditioning systems on before people rise and off when they go to bed. The MHA turns other appliances on or off according to sensed conditions.

In one preferred embodiment, a conversational user interface is used by the MHA to communicate with the user, for example, by using an app on a smartphone 831. The MHA makes suggestions based on its "mindfulness," "perceptiveness," user actions, changing conditions, and previous user interactions. In a preferred embodiment, the MHA 801 starts with an initial set of assumptions: the time the users will rise in the morning, the time the users will come home after work, the awake, asleep, and away temperatures that the users will want. These defaults can be based on an average user. Then, the MHA senses user input, user actions and user presence. The MHA may sense the user manually changing the thermostat temperature. The user could be detected programming a smarter radio alarm clock or a smarter coffee maker. The MHA can detect when the users actually rise in the morning, when the users actually go to bed in the evening, when they actually leave the house and when they actually return. This and other information is combined by the MHA to make suggestions for changes in schedules and conditions, e.g., temperatures, lights, other appliances. The MHA 801 receives direct user input 833 through the interface when the user reacts to a proposed change in assumptions or makes a manual change of the system settings.

Figure 9:
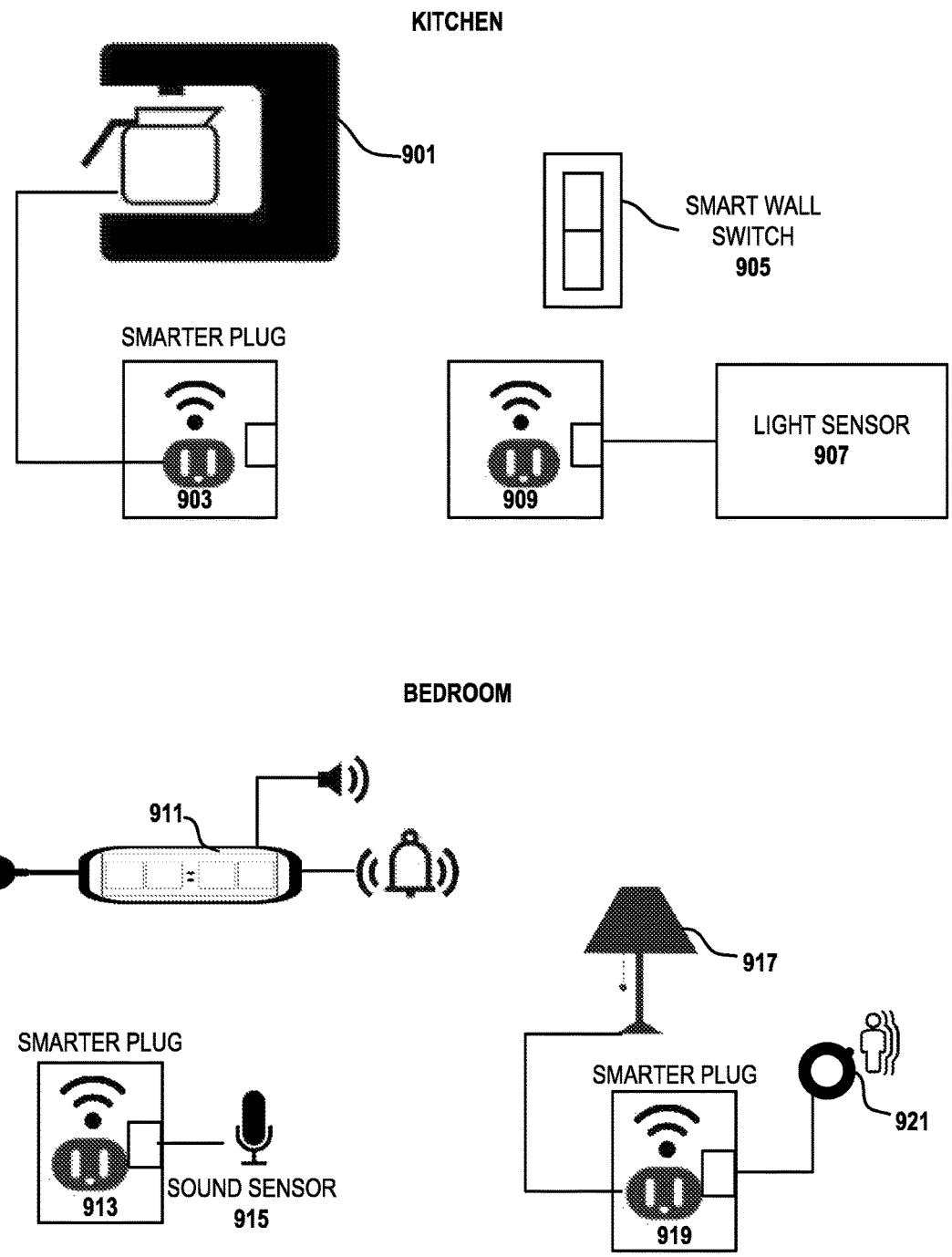
FIG. 9 illustrates embodiments of the invention that include appliances that are "not-smart", but can nonetheless be detected by the sensors coupled to the MHA.

FIG. 9 illustrates embodiments of the invention that include appliances that are "not-smart", but can nonetheless be detected by the sensors coupled to the MHA. For example, a "not-smart" programmable coffee maker 901 can be connected to a smarter plug 903. The smarter plug detects when the automated coffee maker turns on which indicates that the users may plan to rise soon. When a user turns on a light means of an ordinary or smart wall switch 905, this event can be sensed by a light sensor 907 connected to a smarter plug 909 indicating the users are awake or present in the home. The alarm or radio of a standard alarm clock 911 can be detected by a sound sensor 915 coupled to a smarter plug 913 indicating the users plan to rise soon. Turning on a lamp 917 either by actuating the physical switch on the lamp or the smarter button 921 can be sensed by the smarter plug 919 or the optional motion sensor on the smarter button indicating the users are present or awake.

Figure 10:
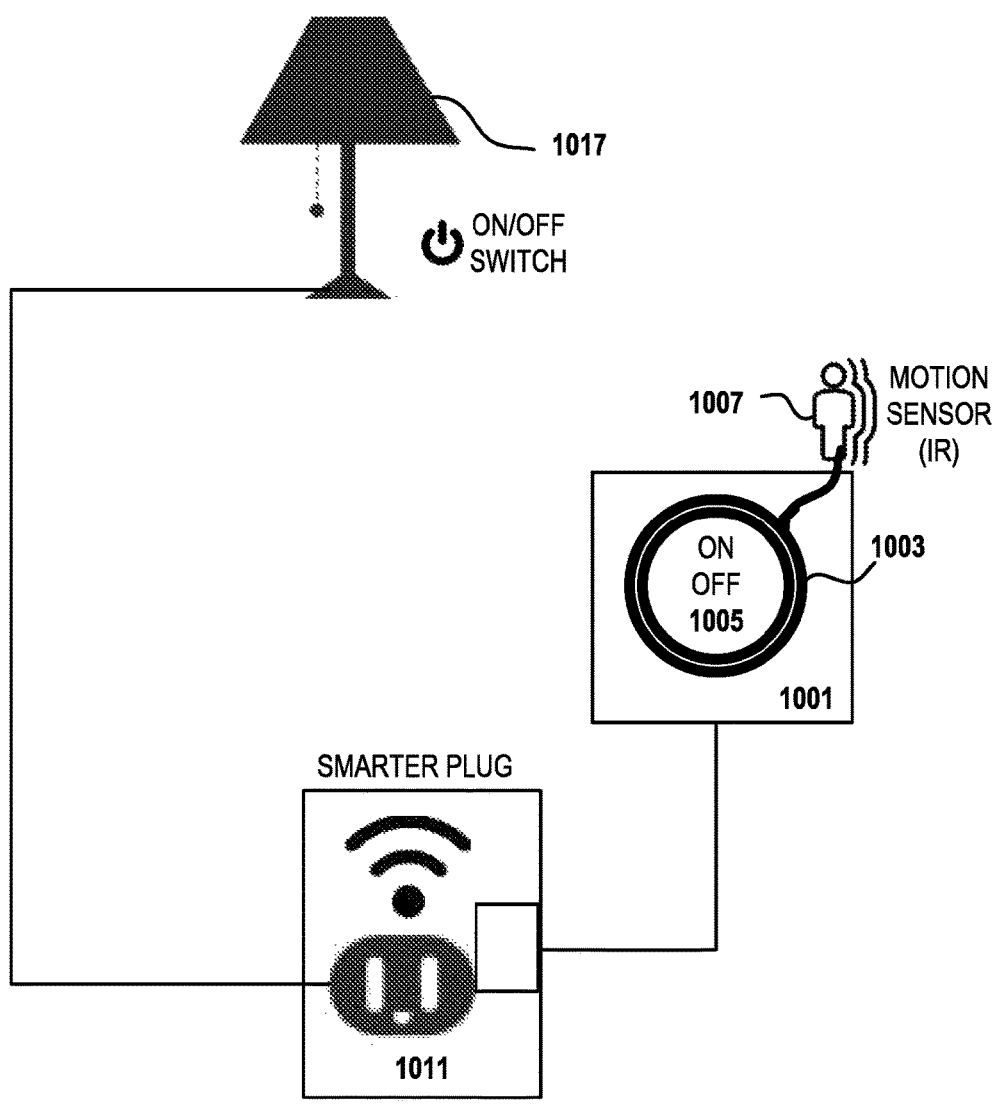
FIG. 10 shows an example of operation of a smarter button according to some embodiments of the invention.

The Smarter Button used in preferred embodiments of the invention is shown in greater detail in FIG. 10. The smarter button 1001 is ergonomic (large and dimly lit) and has an on/off contact-switch 1003 with a variable resistance dial 1005 on a cord. When the user pushes the button switch 1003, the light will come on. The dial 1005 also serves as a dimmer. In preferred embodiments, a smarter button 1001 is plugged into a smarter plug 1011. The smarter button provides a simple and intuitive control of common devices such as desk lamps 1017 and home theater systems (not pictured) without having to use automated interfaces. Optionally, it includes a motion sensor 1007 and a daisy-chained jack (not pictured) for additional controllers and/or sensors. The infrared sensor 1007 can be plugged into the daisy-chained jack for motion detection as well as other sensors that operate in the 0 to 24 V range. For example, when a user enters a dark room in which the automation system has turned out the lights, the user can find the dimly lit button in the dark.

Example uses for the smarter button include placing the button switch on a tabletop next to a lamp or where motion detection is desired. The button is designed to lay on a table next to a lamp to turn it on and off or dim it under program control. The smarter button 1001 solves the problem of entering a dark room where the automation system has turned off all the lights. In prior art system, one cannot turn them on without going to the control panel (often the thermostat) or using a portable app. In preferred embodiments, the smarter button 1001 is an easily located, dimly lit button.

As depicted in FIG. 10, pushing the button or dialing its dial can be used to change the state of any appliance in the MHA system. For example, as shown, a single click on the button will turn on/off the lamp plugged into the same smarter plug (or any other device). If the user turns the dial to dim the lamp into the same plug (or any other device). In one preferred embodiment, the smarter button signals the smarter plug for lower voltage by emitting short pulses. The smarter plug lowers voltages when short pulses are detected. The smarter button signals for higher voltage by emitting longer pulses. No dim state is maintained internally by the smarter button; the user just dials until the desired lighting level is attained. The MHA can be programmed to recognize that a double click of the smarter button can be used to turn on/off or dim secondary devices such as all the lights in the room.

Embodiments of the invention include a smarter motion detector. The smarter motion detector is an MHA IR module that plugs into a Smarter Plug jack, or the daisy-chain jack in the Smarter Plug Modular Switch and Dial sensor. Its uses include detecting motion to control appliances appropriately. The smarter motion detector can be used to detect that people are up and active in the home. In embodiments of the MHA, the motion detector is used as a sensor for a burglar alarm application of the invention.

In embodiments of the invention, a "Smarter" plug is used. FIG. 11 shows one possible electrical implementation of a smarter plug. Some of the modes of the smarter plug are shown in FIG. 3. The smarter plug can be used for scheduled tasks such as turning appliances or light on or off at scheduled times or to dim lights or appliances (restrict power). The smarter plug can also be used to sense a plugged in appliance's state, e.g., an on/off state. The smarter plug can detect closed and open AC circuits. Also as depicted in FIG. 3, a smarter plug can detect that a user wants to override a scheduled "off" event with a "Smarter Plug Auto-Off Override". Any of the modular sensors described in connection with FIG. 2 can be connected to a smarter plug in preferred embodiments.

An example application of an Auto-Off Override is as follows: The home automation system has turned off a lamp according to a schedule or assumption. A person wants to turn on the light without interacting directly with the home automation controller. They intuitively attempt to turn on the lamp using its standard on-off switch. In the initial state, the program has told the smarter plug that the lamp should be off. The lamp's physical switch is on (circuit closed); the smarter plug detects the physical switch being on by measuring the 0.1 volts it supplies, which is not enough to light the light, but sufficient to detect whether the circuit is open or closed. The lamp is not lit. Next, in the first state change, the person turns the on-off switch, attempting to turn the lamp on. This opens the circuit so the smarter plug senses zero volts for the 0.1 volts it supplies. The lamp is not lit. Next, the second state change is detected. The person turns the on-off switch again, attempting to turn the lamp on. The state reverts to the initial state. Having detected these changes, the program tells the smarter plug to turn on the lamp. It sets the output voltage to 120 volts. The lamp is on. According to this aspect of the invention, a person entering a dark room turns on the lamp by using the intuitive actions of attempting to turn on the lamp with its physical switch, and the automated system is able to detect this and react accordingly. This is enabled by the smarter plug emitting and detecting 0.1 volts.

Figure 13:
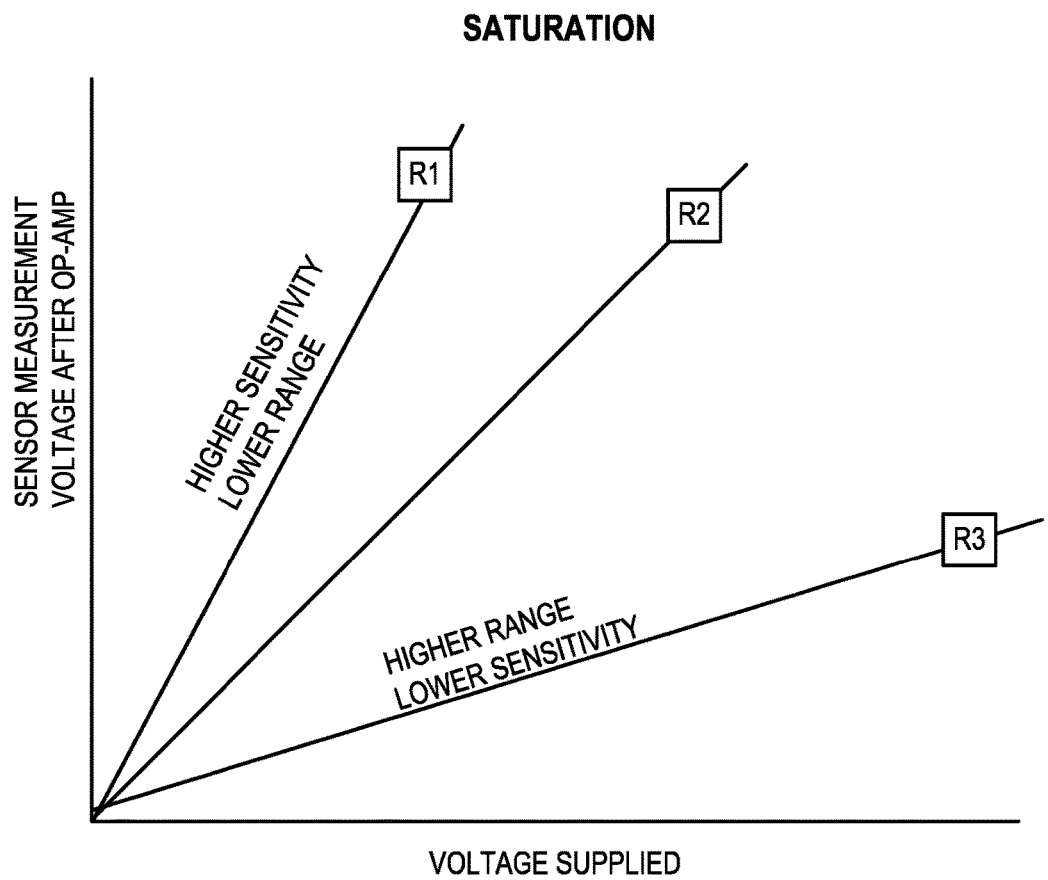
FIG. 13 shows the sensitivities of three op-amp voltage meters in a preferred embodiment of the Smarter Plug.

In one preferred embodiment, the smarter plug 1101 reports three voltage slopes for sensor voltage return. A controller 1103 stores the logic for the other components. Three A-D op-amps 1105, 1107, 1109 are respectively paired with three resistors 1111, 1113, 1115 having different values forming three different op-amp voltage meters. Using the three different op-amp resistor values, the smarter plug 1101 reports three sensor-voltage slopes: a first sensor-voltage slope with higher sensitivity and lower range, a second sensor-voltage slope with lower sensitivity and higher range and a third sensor-voltage slope with a range and a sensitivity intermediate between these ranges. The sensors use a range of zero to 24 V sensor voltage supply 1117 coupled to three op-amp A-D voltage meters. The sensitivities and ranges of the three op-amp voltage meters are depicted in FIG. 13

Higher sensitivity is the ability to detect finer-grain changes in the sensor's input voltage. In this case, the post op-amp sensor measurement voltages very faster, relevant to the input voltage. However, this drives the post op-amp voltage to saturation (no longer able to detect differences) over a shorter range of the input voltage. Conversely, lower sensitivity reduces the ability to differentiate among small voltage changes but operates over a wider range of input voltage without reaching saturation.

With three ranges, the smarter plug can be used with a range of sensors, without having to tune it for op-amp resistance to match particular sensors. It is able to work with sensors that supply different voltage output ranges relative to the range of what they are measuring. For example, a light sensor and a pressure sensor may exhibit such differences. Programs using these post-op-amp measurements have access to all three values simultaneously and such can use the highest sensitivity range that does not saturate over the input measurement range. When the highest-sensitivity range is at saturation, the program can continue to differentiate the readings using the lower-sensitivity ranges.

The smarter plug detects a sharp drop to zero volts indicating an On/Off event. If the smarter plug detects pulses, it indicates dimming. The smarter plug maintains a lower voltage when short pulses detected; it raises voltage when longer pulses detected. In one preferred embodiment, the "dim" state is not maintained, but the plug increases or decreases voltage until person stops turning the dimmer dial. A smarter plug also detects an appliance is drawing amperage. Based on the amperage drawn, the smarter plug can determine whether the appliance is on or off. A 4-prong RJ-11 jack 1119 is included in some embodiments to drive and sense external devices so equipped, such as sensors and 24 V controllers. Devices and appliances to be controlled by the smarter plug are plugged into outlet 1123 which is controlled by programmed controlled dimmer and switch 1121 which detect open and closed states for the monitored devices. The outlet 1123 can supply a 0 voltage turn the monitored device off, a 0.1 voltage to monitor state on the monitor device and a higher voltage up to 120 volts to power the monitored device. The higher voltage can be controlled, i.e. dimmed, according to the commands of the user or MHA. The smarter plug 1101 receives power via plug 1125.

Typical operating parameters for a smarter plug would be AC: Max 120V~/16 A/60 Hz/1800 W, however, the operating parameters will depend on the electrical parameters of the locale in which the MHA is sited. In preferred embodiments, the smarter plug interfaces to home-automation controllers over wireless network 1127.

Figure 12:
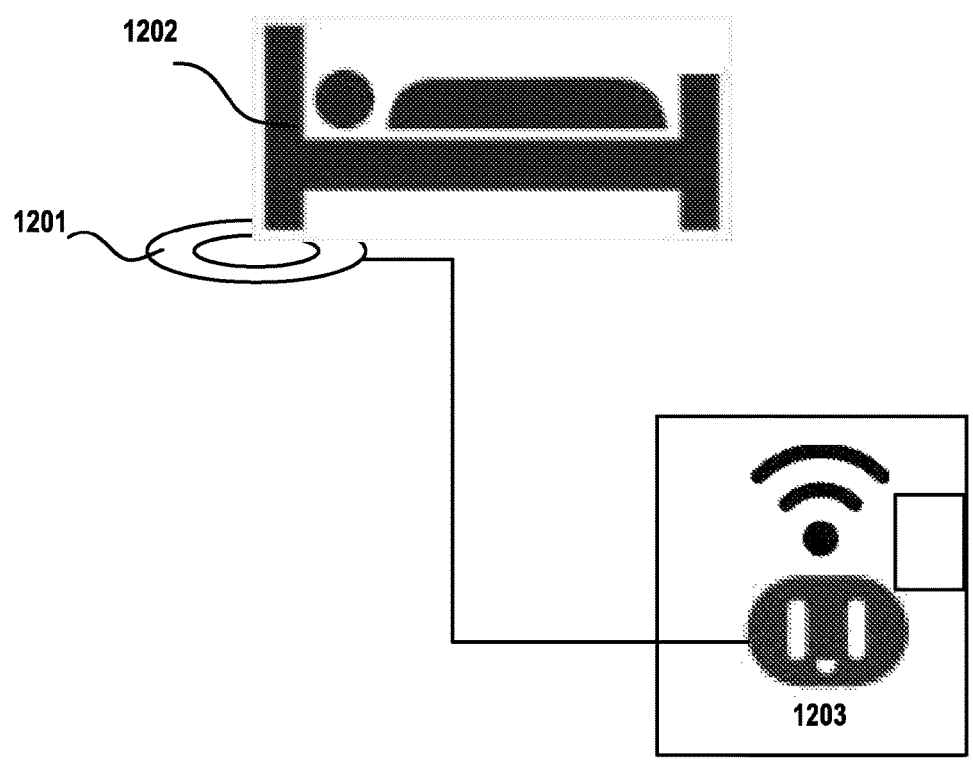
FIG. 12 shows a schematic of a Smarter Pressure Sensor according to some embodiments of the invention.

Embodiments of the invention use a Smarter Pressure Sensor as depicted in FIG. 12. For example, by measuring the pressure of one of the bed legs, the MHA can tell how many people are in bed, which can help the MHA judge what to do and when. The smarter pressure sensor 1201 is placed under furniture 1202 such as a bed leg to sense changes in pressure. Typically, the smarter pressure sensor 1201 is plugged into a smarter plug 1203. Excellent pressure range differentiation is sensed by a triple op-amp smarter plug circuity. The pressure sensor can determine if zero, one, or more people are in a bed, or other furniture. The sensor is used by the MHA to turn off the furnace or A/C when people go to bed or to turn on the furnace or A/C when people rise (if not already triggered by other means.) The pressure sensor can detect entry and exit by sensing pressure under doormats which is useful for burglar-alarm systems.

Embodiments of the invention include a "Smarter" Sound Detector. The smarter sound detector is used to detect activity that generates sound. An illustrative, but not exclusive, list of examples include people talking, sounds from radios and TVs, alarms from alarm clocks, alarms from burglar-alarms and doorbells. According to the sound, the MHA may take some action. Uses of the smarter sound detector include a burglar alarm sensor, a door-bell sensor or a "clap on, clap off" device to turn on another device connected to the MHA. Voltage drives a microphone circuit that attenuates the voltage.

A "Smarter" Radio Alarm Clock is included in some embodiments of the invention. In a preferred embodiment, the smarter radio alarm clock is a high feature, inexpensive, universal clock radio. The smarter radio alarm clock is a "smart" device in that it communicates with the home-automation system. Preferably, it includes an MHA app installable on a smartphone to control the radio alarm clock as well as other aspects of the MHA. The MHA app is preferably designed to runs on iOS and Android devices. Using the smarter radio alarm clock, the MHA notes the time the users set for a morning alarm. The morning alarm time provides "foresight" on when the users plan to rise. The smarter radio alarm clock programs easily from a smartphone app which is also used as input to control other appliances.

Optional features of the smarter radio alarm clock include a gentle rise feature which gradually increases alarm volume, music volume, and/or illumination. Preferably, the smarter radio alarm clock is modular so that optional components can be added later. For example, the smarter radio alarm clock can interface with low to high fidelity speakers using Bluetooth or 3.5 mm audio cable. The smarter radio alarm clock interfaces with lighting and other appliances. It plays sound from multiple electronic-content sources such as music libraries, cloud music and Internet radio. The smarter alarm clock includes waking methods may include an alarm (ringtone), music (any music available on a smartphone) and Internet radio stations.

A Smarter Amperage Meter is included in embodiments of the invention. Preferably, it is configured as an amp meter with male prongs that plugs into the Smarter Plug power outlet and with a female receptacle into which one plugs the appliance. Operating parameters include AC: Max 120V~/16 A/60 Hz/1800. An optional RJ11 port connects to the Smarter Plug low-voltage port to report the amperage used. The MHA reports per-appliance energy usage can motivate customers to use less electricity.

Embodiments of the invention include a Smarter Light Meter. The light meter plugs into a Smarter Plug socket to sense the level of light in a room. The light level is information that the MHA can use to adjust appliances such as the furnace and A/C.

The MHA makes decisions on when to turn on and off particular appliances or set their controls (such as temperature settings) based on real-time sensors such as motion, sound, pressure, amperage and light to determine whether the users (or others) are awake and active in the house.

In a preferred embodiment, the MHA assumptions are a set of settable defaults. The default MHA assumptions are used when the MHA is given no other indications of when the users are likely to rise. However, through a user interface provided by the MHA app, users can easily refine the MHA assumptions. Within the MHA app, a guided tour to refine the MHA's initial assumptions can be presented to point out the more important assumptions such as the Awake/asleep/away temperatures and rise times and patterns (days of the week). In a preferred embodiment, the guided tour is presented by the app and web page and shows users the assumptions visually, not just in words and numbers.

As mentioned above, to propose changes to existing MHA assumptions, in preferred embodiments, the MHA communicates by sending instant messages and/or through the MHA app. The users can turn off the messaging, e.g., message back "Be silent" or "Shut up" or change the instant message setting by using the MHA app. The users can accept, reject, or modify MHA proposed changes to the assumptions by responding to instant messages. By tracking its accepted and rejected proposals, the MHA avoids making suggestions that have been rejected many times in the history. The MHA tracks suggestions which have been made and whether they were accepted or rejected. If the user has rejected such suggestions many times, the MHA does not repeat them. For example, if the MHA proposed changing the "Asleep" temperature because the user changed the temperature manually during the night, and the user rejected that suggestion, the MHA might ask again. If they say "no" a predetermined number of times, then the MHA would stop asking that question.

As an example of out-of-the-box default MHA assumptions. The Asleep, Awake and Away temperatures at various times during heating season: Asleep temperature: 62 degrees; Awake temperature: 70 degrees; Away temperature: 55 degrees. In the default MHA assumption 5/2 (weekday/weekend) programming is used: One set of assumptions for weekdays and one set of assumptions for weekends. The user can switch to other standard time-temperature models, e.g., 1-1-1-1-1-1-1: different each day; 5-2: Same on all 5 weekdays, different on the weekend. 5-1-1: Same on all 5 weekdays, different Sat., and different Sun; 7: Same every day. As an example 5/2 schedule, the weekday schedule is to rise at 6 AM and return home at 6 PM and the weekend schedule is to rise 8 AM and the user is in the house all day. As discussed above, the MHA will ask the user if the MHA should update these assumptions as the MHA senses different patterns.

As mentioned above, the MHA uses a natural, conversation user interface. As an example, the proposals for the MHA to update MHA assumptions would conform to the following in a preferred embodiment. The MHA instant messages the change suggestions. Early on, the MHA gives users the option to stop receiving these messages via instant message. If the users do not have rise time indicators other than the default MHA assumptions and if the users have never modified the assumed rise times, the MHA might be programmed to message, "I apologize for the frequency at which I am likely to ask you questions as we get to know each other. Hopefully it won't take long for us to agree on my assumptions about your habits. For any query I send you, if you reply with "Silence," and I will stop sending you messages. You need not respond to my messages. If you don't, I will assume I should refine my assumption."; "I noticed you rose at 5:30 AM yesterday. Shall I assume you will rise at that time fairly often?"; "I noticed you rose at 9 AM on Saturday and 7 AM on Sunday. Shall I assume these wake times for future weekends?"

If the users have modified the assumed rise times from the default MHA assumptions, The MHA might provide one or more of the following dialogs: "I noticed that for several days you rose around 5:30 AM. Shall I assume you will rise at this time fairly often?"; "I noticed you rose near 9 AM on Saturday and 7 AM on Sunday for the last two weekends. Shall I assume these wake times for all weekend?"; "I noticed that for several days you returned to the house at 6:30 PM. Shall I assume I should adjust the temperature accordingly?" "We agreed to change my assumption of your rise-time to 5 AM. Shall I reprogram the coffer maker to start brewing at 4:30 AM?"; "I noticed that last night you adjusted the temperature to 65 degrees. Shall I assume that will be the "Sleep" temperature from now on?"; "I noticed that yesterday you adjusted the temperature to 72 degrees. Shall I assume that will be the "Awake" temperature from now on?"; "I noticed that yesterday before you left the house, you adjusted the temperature to 50 degrees. Shall I assume that will be the "Away" temperature from now on?"

In one preferred embodiment, the MHA need not make assumptions about when the user retires as the MHA senses when they retire through sensors such as the pressure sensor or motion sensor.

Unlike prior art systems, in preferred embodiments of the invention, there are many times and temperatures (if not all) the user need not program. For example, the user does not need to program when to adjust the temperature as they retire if there is an MHA bed pressure sensor or a combination of motion, light, and sound sensors as the MHA can detect when they have retired. In this embodiment, the MHA does not need to know or assume a time before they retire. The MHA takes action as the users retire. Another example is when the users have employed a smarter radio alarm clock, the users do not need to adjust the temperature before they rise. Using the information from the smarter radio alarm clock, the MHA changes the temperature in time for the house to be at temperature when the users rise. User programming of a smart programmable coffee maker or other MHA-compatible coffee pots will give the MHA similar information.

The MHA uses a slightly different process when changing the temperature when the user rises (not in advance because of a programmed event). Then the MHA makes an assumption that the users will repeat this behavior at that time on weekdays, Saturdays, or Sundays (5-1-1 or whichever pattern the users chose). The home automation system could include an MHA bed pressure sensor, an MHA sound sensor (to listen to their clock radio's alarm in the morning), motion and light sensors to sense user behavior. Using a combination of motion, light, and sound sensors, the MHA can detect when the user activity such as rising in the morning. Using this information, the MHA sets the times for the Asleep, Awake, and/or Away times, making new assumptions for the Asleep, Awake, and/or Away temperatures. In the event that the user wants changes from the assumptions, he can converse with the MHA using the interface or manually sets new temperatures during those timeslots.

In some embodiments of the invention, the MHA can be programmed by the user's responses to a set of common questions for adjusting variable levels (e.g., temperatures) at varying times, on varying days of the week, with varying programming-schedule structures. The user is asked their preferences for variable temperatures, i.e. what temperature like when they are awake, when they are asleep and when they are away. The user is asked their preferences for the varying times, i.e. when they are anticipated to wake, when they are anticipated to return and when they go to bed. The user is asked how long in advance, e.g., from waking, to change appliance settings, for example, when to turn up the furnace in time to reach a desired temperature before they rise and when to turn on the coffee maker in time before they rise. If the user's estimates are incorrect, the MHA can correct the assumptions according to the sensor data, i.e. when they actually wake, when they actually leave, when they actually return. The user is asked about their preferences for varying programming-schedule structures, e.g., different each day of the week (1-1-1-1-1-1-1), different on weekends (5-2), different on Saturday and Sunday (5-1-1) or the same every day (7).

In preferred embodiments, the MHA uses various triggers for changing behaviors and/or assumptions. For example, the user sets a schedule for a smart device such as a smart radio alarm clock or a smart coffee maker. The MHA assumes the user will use these devices to determine their waking time. The user does not need to use a smart device to indicate their rising time. The MHA uses past behavior to form new assumptions, for example, when the users have risen on weekdays and weekends. If there appears to be a pattern, the MHA may revise an assumption. The MHA also uses past responses to suggestions to determine whether an assumption should be adjusted.

The user manually adjusts a sensor (e.g., the thermostat's temperature dial). The MHA makes an assumption that the user want the new temperature to be the assumed temperature for that period (awake, asleep or away).

In embodiments of the invention, many party sensors will work in place of some of the MHA sensors. Many companies build many smart plugs and sensors for home automation; the MHA can use input from and control many of these devices and appliances. The Smarter Button provides a simple and intuitive control of common devices such as desk lamps and home-theater systems without having to use automated interfaces. For example, the smarter button can be used to turn on lights in a dark room using a dimly-lit table-top switch without having to use an automated interface (an app). Its ergonomic construction, large and dimly lit, includes an on/off contact-switch with a variable resistance dial on a cord plugged into a smarter plug. The smarter button includes a large dial for diming lights and a daisy-chained jack for additional controllers and/or sensors.

The foregoing description of the embodiments has been presented for purposes of illustration only. It is not exhaustive and does not limit the embodiments to the precise form disclosed. Those skilled in the art will appreciate from the foregoing description that modifications and variations are possible in light of the above teachings or may be acquired from practicing the embodiments. For example, the described steps need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents.

The invention claimed is:

1. A home automation system comprising:
   a memory to store a set of assumptions about scheduled settings in the home automation system which control a set of devices in a home;
   a processor to control the set of devices according to the set of assumptions;
   a set of sensors coupled to the home automation system, the set of sensors for detecting input indicating activity in the home, at least one of the set of sensors being a smarter plug sensor assigned to control a first device in the set of devices;
   wherein the smarter plug sensor comprises:
   a controller which stores logic for operating the smarter plug sensor; and
   three A-D op-amps respectively paired with three resistors having different values forming three different op-amp voltage meters;
   wherein the three different op-amp voltage meters respectively report a first sensor-voltage slope with a higher sensitivity and a lower range, a second sensor-voltage slope with a lower sensitivity and a higher range and a third sensor-voltage slope with a range and a sensitivity intermediate between these ranges; and
   a computer driven user interface for presenting suggestions for changing a first assumption of the set of assumptions based on a detected input.

2. The home automation system as recited in claim 1, wherein the smarter plug sensor comprises a smarter motion detector configured to sense motion in a vicinity of the motion detector; and wherein the detected motion is used to present a changed assumption relating to a change in schedule of a user.

3. The home automation system as recited in claim 1, wherein the smarter plug sensor comprises a smarter sound detector configured to sense a sound in a vicinity of the sound detector; and
   wherein the detected motion is used to present a changed assumption relating to a change in schedule of a user.

4. The home automation system as recited in claim 1, wherein the smarter plug sensor comprises a smarter pressure sensor configured to sense a change in pressure exerted on a piece of furniture in a home; and wherein the detected motion is used to present a changed assumption relating to a change in schedule of a user.

5. The home automation system as recited in claim 1, wherein the system is responsive to an input from the user interface to change the first assumption according to the suggestion.

6. The home automation system as recited in claim 1, wherein the input from the sensor includes at least one of:
   a change in a reading of a sensor that indicates the inhabitant has risen, thus indicating an actual value of the rising time; and
   detecting an arrival of the inhabitant indicating an actual arrival time.

7. The home automation system as recited in claim 1 wherein each of the set of assumptions is associated with one of an Asleep state in which the user is asleep in the home, an Awake state in which the user is awake in the home or an Away state in which the user is away from the home.

8. The home automation system as recited in claim 1, wherein a change in schedule for a first device controlled by the home automation system results in a change to an assumption which controls a second device controlled by the home automation system.

9. The home automation system as recited in claim 1, wherein a detected input from a smarter plug sensor which controls a first device, the detected input indicates a change in state of the first device results in a change to an assumption which controls a second device controlled by the home automation system.

10. A method for home automation comprising:
    storing a set of assumptions about scheduled settings in a home automation system which control a set of devices in a home, the set of assumptions stored in a computer memory;
    receiving a first input from a sensor coupled to a first device controlled by the home automation system, the input indicating activity in the home, wherein the sensor is a smarter plug sensor assigned to control the first device;
    wherein the smarter plug sensor comprises:
    a controller which stores logic for operating the smarter plug sensor; and
    three A-D op-amps respectively paired with three resistors having different values forming three different op-amp voltage meters;
    wherein the three different op-amp voltage meters respectively report a first sensor-voltage slope with a higher sensitivity and a lower range, a second sensor-voltage slope with a lower sensitivity and a higher range and a third sensor-voltage slope with a range and a sensitivity intermediate between these ranges; and
    presenting suggestions in the user interface for changing a first assumption of the set of assumptions based on the first input.

11. The method as recited in claim 10, further comprising:
    receiving a second input from a user interface to change the at least one of the assumption according to the suggestion; and
    changing the at least one of the assumptions according to the suggestion.

12. The method as recited in claim 10, wherein the settings include a least one of:
    a rising time at which an inhabitant of the house rises;
    an arrival time in the day at which an inhabitant arrives from work; and
    a thermostat setting for a desired temperature of the house.

13. The method as recited in claim 11, wherein the second input from the user interface includes a least one of:
    changing the thermostat setting related the desired temperature of the house; programming an alarm determining the rising time; and
    programming a device start time related to the rising time.

14. The method as recited in claim 10, wherein the first input from the sensor includes at least one of:
    a change in a reading of a sensor that indicates the inhabitant has risen, thus indicating an actual value of the rising time; and
    detecting an arrival of the inhabitant indicating an actual arrival time.

15. The method as recited in claim 10 wherein each of the set of assumptions is associated with one of an Asleep state in which the user is asleep in the home, an Awake state in which the user is awake in the home or an Away state in which the user is away from the home.

16. The method as recited in claim 10, further comprising:
    detecting a change in schedule for a first device controlled by the home automation system;
    responsive to the change in schedule for the first device, changing an assumption which controls a second device controlled by the home automation system; and
    controlling the second device according to the changed assumption.

17. The method as recited in claim 10, further comprising:
    detecting an input from a smarter plug sensor, wherein the smarter plug sensor controls a first device, and the input indicates a change in state of the first device;
    responsive to the change in state of the first device, changing an assumption which controls a second device controlled by the home automation system; and
    controlling the second device according to the changed assumption.

18. A computer program product in a non-transitory computer readable medium for use in a home automation system, the computer program product holding computer program instructions executed by the data processing system for performing home automation, the computer program instructions comprising:
    program code, operative to store and modify a set of assumptions about scheduled settings in the home automation system which control a set of devices in a home;
    program code, operative to control the set of devices according to the set of assumptions;
    program code, operative to receive input from a set of sensors coupled to the home automation system, the input from the set of sensors for detecting input indicating activity in the home, at least one of the set of sensors being a smarter plug sensor assigned to control a first device in the set of devices;

wherein the smarter plug sensor comprises:
- a controller which stores logic for operating the smarter plug sensor; and
- three A-D op-amps respectively paired with three resistors having different values forming three different op-amp voltage meters;
- wherein the three different op-amp voltage meters respectively report a first sensor-voltage slope with a higher sensitivity and a lower range, a second sensor-voltage slope with a lower sensitivity and a higher range and a third sensor-voltage slope with a range and a sensitivity intermediate between these ranges; and
- program code for presenting a user interface for presenting suggestions for changing a first assumption of the set of assumptions based on a detected input.

* * * * *